(12) United States Patent
Haraguchi et al.

(10) Patent No.: US 10,319,979 B2
(45) Date of Patent: Jun. 11, 2019

(54) BATTERY AND METHOD OF MANUFACTURING BATTERY

(71) Applicant: Sanyo Electric Co., Ltd., Daito-shi, Osaka (JP)

(72) Inventors: Shin Haraguchi, Kadoma (JP); Kyosuke Miyata, Osaka (JP); Koji Funami, Kadoma (JP)

(73) Assignee: SANYO Electric Co., Ltd., Daito-shi (JP)

( * ) Notice: Subject to any disclaimer, the term of this patent is extended or adjusted under 35 U.S.C. 154(b) by 307 days.

(21) Appl. No.: 15/120,442

(22) PCT Filed: Jan. 26, 2015

(86) PCT No.: PCT/JP2015/000315
§ 371 (c)(1),
(2) Date: Aug. 19, 2016

(87) PCT Pub. No.: WO2015/129154
PCT Pub. Date: Sep. 3, 2015

(65) Prior Publication Data
US 2017/0069901 A1    Mar. 9, 2017

(30) Foreign Application Priority Data
Feb. 27, 2014   (JP) .................................. 2014-036282

(51) Int. Cl.
*H01M 2/26* (2006.01)
*H01M 2/02* (2006.01)
*H01M 10/04* (2006.01)

(52) U.S. Cl.
CPC ........... *H01M 2/263* (2013.01); *H01M 2/022* (2013.01); *H01M 2/26* (2013.01); *H01M 10/0422* (2013.01); *H01M 2/024* (2013.01)

(58) Field of Classification Search
CPC .. H01M 2/263; H01M 10/0422; H01M 2/022; H01M 2/26; H01M 2/024
See application file for complete search history.

(56) References Cited

U.S. PATENT DOCUMENTS 8,753,767 B2 * 6/2014 Shimamura ........... H01M 2/021
429/178
2009/0317707 A1   12/2009 Cha
(Continued)

FOREIGN PATENT DOCUMENTS

JP    10-154490 A     6/1998
JP    3324372 B2      9/2002
(Continued)

OTHER PUBLICATIONS

International Search Report dated Mar. 10, 2015, issued in counterpart application No. PCT/JP2015/000315 (2 pages).

*Primary Examiner* — Muhammad S Siddiquee
(74) *Attorney, Agent, or Firm* — Westerman, Hattori, Daniels & Adrian, LLP

(57) ABSTRACT

A battery includes a power generation component including a positive electrode, a negative electrode, and an electrolyte, and a battery case accommodating the power generation component. The negative electrode includes a first lead (17) having a single layer structure whose main component is nickel, and a second lead (18) having a layered structure including a Ni layer (18a) whose main component is nickel and a Cu layer (18b) whose main component is copper. The battery includes a layered portion (35) formed of the leads that are superposed such that the Ni layer (18a) of the second lead (18) faces the first lead (17). Part of the layered portion (35) is welded to an inner surface of the battery case with the first lead (17) at the layered portion (35) being disposed on a battery case side.

7 Claims, 3 Drawing Sheets

(56) References Cited

U.S. PATENT DOCUMENTS

2009/0317712 A1* 12/2009 Kim .................. H01M 2/22
                                                                                    429/164
2010/0273033 A1* 10/2010 Fujikawa .............. H01M 2/263
                                                                                     429/61

FOREIGN PATENT DOCUMENTS

| JP | 2002-352789 A | 12/2002 |
| --- | --- | --- |
| JP | 2007-273258 A | 10/2007 |
| JP | 2009-259749 A | 11/2009 |
| JP | 2010-3686 A | 1/2010 |
| JP | 2010-3696 A | 1/2010 |

* cited by examiner

BATTERY AND METHOD OF MANUFACTURING BATTERY

TECHNICAL FIELD

The present invention relates to a battery and a method of manufacturing the battery.

BACKGROUND ART

PTL 1 discloses a cylindrical battery that includes no active material layer at both left and right end portions of a porous core material forming a negative electrode and includes two plain portions protruding in the same direction perpendicular to a winding direction. The two plain portions are spot welded to an inner bottom portion of a battery case so as to be superposed and function as negative electrode leads. That is, the cylindrical battery in PTL 1 includes two negative electrode leads composed of the same material.

CITATION LIST

Patent Literature

PTL 1: Japanese Patent No. 3324372

SUMMARY OF INVENTION

Technical Problem

In the case where the negative electrode leads are superposed and welded (spot welded) to the inner surface of the battery case, the use of copper leads, for example, makes it easy to break a weld because bonding strength between the leads and bonding strength between each of the leads and the battery case are low. Since copper has a low electric resistance, copper is unlikely to produce Joule heat, and it is difficult to increase the depth of fusion at which metals of the leads melt (when an electric current is increased to increase the depth of fusion, spatters are generated). In contrast, the use of nickel leads improves the bonding strengths. In this case, however, spatters are easily generated, and scattering metal particles enter the inside of an electrode body, thereby breaking a separator and causing a problem of an internal short circuit of the battery.

Also in the case where negative electrode leads 101 having a layered structure of Ni layer/Cu layer/Ni layer are stacked and welded like an example illustrated in FIG. 6, it is difficult to increase the depth of fusion of a weld 100 due to an influence of a Cu layer of the lead welded on the side of a battery case 102. Accordingly, the bonding strength between the negative electrode leads 101 at the weld 100 and the bonding strength between each negative electrode lead 101 and the battery case 102 are low. In the structure illustrated in FIG. 6, the weld shape is not stable, and variations in the bonding strengths increase.

Solution to Problem

A battery according to the present invention includes a power generation component including a positive electrode, a negative electrode, and an electrolyte, and a battery case accommodating the power generation component. The negative electrode includes a first lead having a single layer structure whose main component is nickel, and a second lead having a layered structure including a Ni layer whose main component is nickel and a Cu layer whose main component is copper. A layered portion is formed of the leads that are superposed such that the Ni layer of the second lead faces the first lead. Part of the layered portion is welded to an inner surface of the battery case with the first lead at the layered portion being disposed on a battery case side.

A method of manufacturing a battery according to the present invention is a method of manufacturing a battery including a power generation component including a positive electrode, a negative electrode, and an electrolyte, and a battery case accommodating the power generation component. The method includes a step of attaching, to the negative electrode, a first lead having a single layer structure whose main component is nickel, and a second lead having a layered structure including a Ni layer whose main component is nickel and a Cu layer whose main component is copper, and a welding step of forming a layered portion in a manner in which the leads are superposed such that the Ni layer of the second lead faces the first lead and welding part of the layered portion to an inner surface of the battery case with the first lead at the layered portion facing a battery case side.

Advantageous Effects of Invention

According to the present invention, in the battery including the negative electrode leads, bonding strength between the leads and bonding strength between each of the leads and the battery case can be improved while generation of spatters is suppressed. Consequently, an internal short circuit of, for example, an electrode body due to spatters generated in, for example, the welding step is suppressed, and breakage of the weld is unlikely to occur.

DESCRIPTION OF EMBODIMENTS

Figure 1:
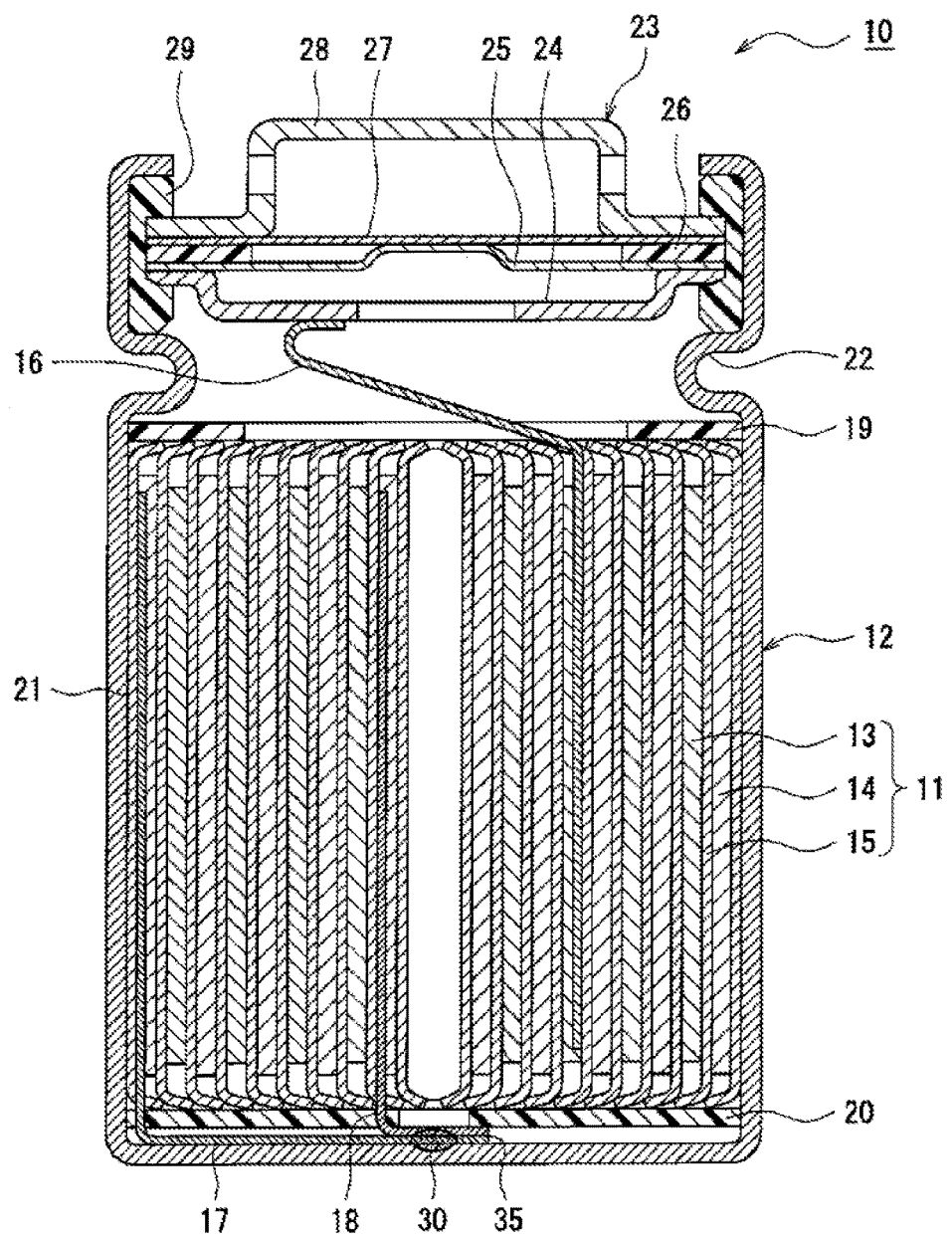
FIG. 1 is a sectional view of a battery in an embodiment of the present invention.

An embodiment of the present invention will hereinafter be described in detail with reference to the drawings. The drawings referred in the embodiment are schematically illustrated, and dimensional ratios of components illustrated in the drawings, for example, may differ from actual ratios. Specific dimensional ratios, for example, should be estimated by reference to the following description. For convenience of the description, in a battery, a sealing body side is regarded as an upper side and a bottom surface portion side of a case body is regarded as a lower side.

FIG. 1 is a sectional view of a battery 10. As illustrated in FIG. 1, the battery 10 includes a power generation component including an electrode body 11 and the electrolyte, and a battery case 12 accommodating the power generation component. The electrode body 11 has, for example, a winding structure in which a positive electrode 13 and a negative electrode 14 are wound with a separator 15 interposed therebetween. The battery case 12 is a metallic container accommodating the electrode body 11 and the electrolyte, includes a case body 21, for example, in a cylindrical shape with a bottom, and is configured such that an opening of the case body 21 is closed by a sealing body 23. That is, the battery 10 is a so-called cylindrical battery. In the embodiment, the cylindrical battery is described by way of example, but the application of the present invention is not limited thereto.

The electrode body 11 includes a positive electrode lead 16 attached to the positive electrode 13 and plural negative electrode leads attached to the negative electrode 14. Disposing the plural negative electrode leads enables the direct current resistance of the battery 10 to be decreased and enables input-output characteristics to be improved. A plurality of the positive electrode leads 16 may be disposed. The number of the disposed negative electrode leads may be three or more but is preferably two in the case of the cylindrical battery. In the embodiment, a first lead 17 having a single layer structure and a second lead 18 having a layered structure are used as the negative electrode leads.

Insulating plates 19 and 20 are preferably disposed above and below the electrode body 11, respectively. That is, the electrode body 11 is interposed between the two insulating plates from above and below. The positive electrode lead 16 extends to the side of the sealing body 23 via a through-hole of the insulating plate 19. The first lead 17 and the second lead 18, which are the negative electrode leads, extend to a bottom surface portion side of the case body 21 via a through-hole of the insulating plate 20. As described in detail later, part of a layered portion 35 formed of the first lead 17 and the second lead 18 that are superposed is welded to the inner surface of the battery case 12 (the case body 21).

The positive electrode 13 includes a positive electrode current collector of, for example, a metallic foil and positive electrode active material layers formed on the positive electrode current collector (these are not illustrated). A metallic foil, such as aluminum, that is stable at a potential range of the positive electrode 13, or a film in which the metal is disposed on its surface layer, for example, may be used for the positive electrode current collector. The positive electrode current collector has, for example, a long sheet shape and the positive electrode active material layers are formed on both surfaces thereof. The positive electrode active material layers preferably contain a conductive material and a binder in addition to a positive electrode active material. The positive electrode lead 16 is attached to exposed areas on which no positive electrode active material layer is formed and in which a surface of the positive electrode current collector is exposed.

The positive electrode active material is, for example, a composite oxide containing lithium. Examples of the composite oxide containing lithium include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ {$0<x\leq1.2$, $0<y\leq0.9$, $2.0\leq z\leq2.3$, M is at least one of Na, Mg, Sc, Y, Mn, Fe, Co, Ni, Cu, Zn, Al, Cr, Pb, Sb, and B}.

Figure 2:
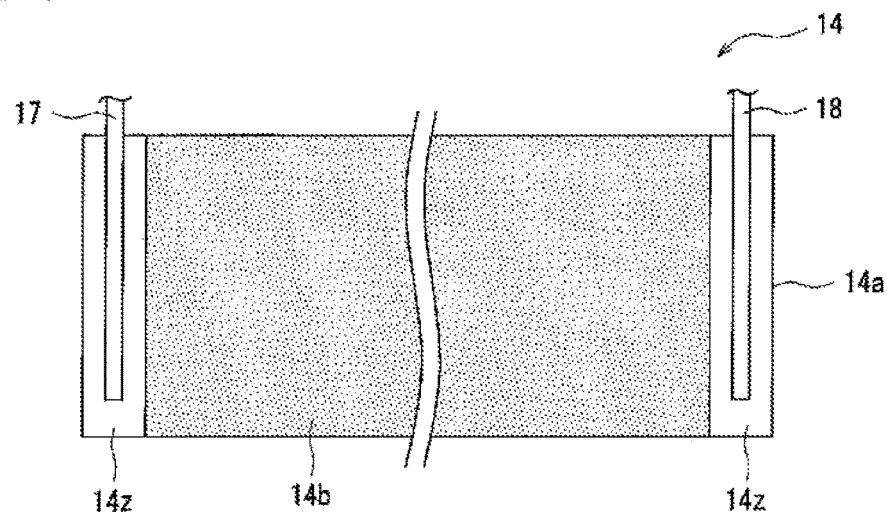
FIG. 2 is a diagram illustrating a negative electrode that is extracted in the embodiment of the present invention.

FIG. 2 is a diagram illustrating the negative electrode 14 that is extracted.

As illustrated in FIG. 2, the negative electrode 14 includes a negative electrode current collector 14a of, for example, a metallic foil and negative electrode active material layers 14b formed on the negative electrode current collector 14a. A metallic foil, such as aluminum or copper, that is stable at a potential range of the negative electrode 14, or a film in which the metal is disposed on its surface layer, for example, may be used for the negative electrode current collector 14a. The negative electrode current collector 14a has, for example, a long sheet shape and the negative electrode active material layers 14b are formed on both surfaces thereof. The negative electrode active material layers 14b preferably contain a binder in addition to a negative electrode active material. A conductive material may be contained as needed.

Examples of the negative electrode active material include natural graphite, synthetic graphite, lithium, silicon, carbon, tin, germanium, aluminum, lead, indium, gallium, a lithium alloy, carbon or silicon in which lithium is intercalated in advance, and an alloy or mixture thereof.

The two negative electrode leads (the first lead 17 and the second lead 18) are attached to the negative electrode current collector 14a, as described above. At portions to which the first lead 17 and the second lead 18 are attached, the negative electrode active material layers 14b are not formed, and exposed areas 14z in which a surface of the negative electrode current collector 14a is exposed are formed. In an example illustrated in FIG. 2, the exposed areas 14z are formed on both edges of the negative electrode current collector 14a in the longitudinal direction. That is, the leads are attached to the edges of the negative electrode 14 in the longitudinal direction. The arrangement of the negative electrode leads is not limited thereto. For example, one of the leads may be attached to a central portion of the negative electrode current collector in the longitudinal direction.

For example, a porous sheet that is permeable to ions and insulative is used for the separator 15. Specific examples of the porous sheet include a fine porous thin film, a woven fabric, and a non-woven fabric. The material of the separator 15 is preferably cellulose or olefin series resin such as polyethylene or polypropylene. The separator 15 may be a layered body including a cellulosic fiber layer and a thermoplastic resin fiber layer such as an olefin series resin layer.

The electrolyte is a non-aqueous electrolyte containing, for example, a non-aqueous solvent and an electrolyte salt such as a lithium salt dissolving in the non-aqueous solvent. The non-aqueous electrolyte is not limited to a liquid electrolyte and may be a solid electrolyte using, for example, a gelling polymer. For example, esters, ethers, nitriles such as acetonitrile, amides such as dimethylformamide, and a mixed solvent of two or more of these may be used for the non-aqueous solvent. The non-aqueous solvent may contain a halogen-substituted product in which a hydrogen atom in the solvent is substituted with a halogen atom such as fluorine.

In the embodiment, the first lead 17 and the second lead 18 are connected to the inner surface of a bottom surface portion (referred to as an inner bottom portion below) of the case body 21. That is, the case body 21 is used also as a negative electrode external terminal. The positive electrode lead 16 is connected to the lower surface of a filter 24 of the sealing body 23 described later. A cap 28 of the sealing body 23 electrically connected to the filter 24 becomes a positive electrode external terminal.

The case body 21 preferably includes a support portion 22 on which the sealing body 23 can be disposed. The support portion 22 is formed such that part of the inner surface of the case body 21 protrudes toward the inside, and the support portion 22 supports the sealing body 23 on an upper surface of the protruding portion. The support portion 22 is formed, for example, in a manner in which a side surface portion of the case body 21 is pressed from the outside. The electrode body 11 and the electrolyte (power generation component) are accommodated below the support portion 22 of the case body 21.

The material of which the case body 21 is composed is, for example, copper, nickel, iron, or an alloy thereof and is preferably iron or an iron alloy. In the case where the case body 21 is made of iron, a Ni plating layer 21a made of nickel or a nickel alloy is preferably formed on the inner surface of the case body 21, for example, in order to prevent corrosion of iron and to improve the bonding strength to each of the negative electrode leads. The thickness of the case body 21 is, for example, about 0.2 to 0.4 mm, and the thickness of the Ni plating layer 21a is, for example, about 0.001 to 0.05 mm.

The sealing body 23 is preferably formed of plural members that are superposed. In the embodiment, the sealing body 23 is formed such that the filter 24, a lower valve member 25, an insulating plate 26, an upper valve member 27, and the cap 28 are superposed in this order from below. The filter 24 is a member to which the positive electrode lead 16 is connected. The cap 28 is a member disposed on the uppermost portion (outermost portion) of the sealing body 23 and functions as the positive electrode external terminal. A gasket 29 is disposed in a space between the case body 21 and the sealing body 23. Thus, the inside of the battery case 12 is sealed.

The members of the sealing body 23 (except for the insulating plate 26) are electrically connected to each other. Specifically, the filter 24 and the lower valve member 25 are bonded to each other at their circumferential portions, and the upper valve member 27 and the cap 28 are bonded to each other at their circumferential portions. In contrast, the lower valve member 25 and the upper valve member 27 are in contact with each other at their central portions, and the insulating plate 26 is interposed between their circumferential portions. When the internal pressure of the battery 10 is increased, the lower valve member 25 is first broken. This causes the upper valve member 27 to expand upward and an electrical connection to the lower valve member 25 is broken. When the internal pressure is further increased, the upper valve member 27 is broken, and gas produced passes through a vent hole of the cap 28 and is discharged to the outside.

The structure of a weld 30 between the negative electrode leads and a method of manufacturing the battery 10 (particularly, a step of welding the negative electrode leads) will now be described in detail with reference to FIG. 3 to FIG. 5.

The negative electrode 14 includes the first lead 17 having a single layer structure and the second lead 18 having a layered structure, as described above. In the embodiment, the first lead 17 is disposed on the outer circumferential side (end side of a winding) of the electrode body 11, and the second lead 18 is disposed on the inner circumferential side (start side of the winding) of the electrode body 11. The battery 10 is featured such that the negative electrode leads are not the same but are different leads whose materials and structures are different from each other.

Figure 3:
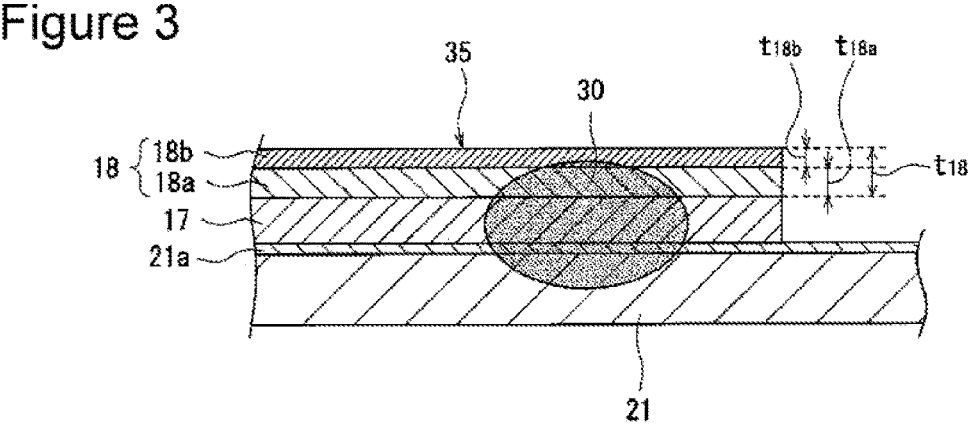
FIG. 3 is a diagram illustrating a weld between negative electrode leads in the embodiment of the present invention.

FIG. 3 is an enlarged view of the weld 30 and the vicinity thereof.

As illustrated in FIG. 3, the battery 10 includes the layered portion 35 formed of the leads that are superposed such that a Ni layer 18a of the second lead 18 faces the first lead 17. Part of the layered portion 35 is welded to the inner surface of the case body 21 with the first lead 17 at the layered portion 35 being disposed on the side of the case body 21 of the battery case 12. A region illustrated by dots in FIG. 3 is the weld 30 formed in a manner in which metals of which the leads are composed and a metal of which the case body 21 is composed are melted by welding. The weld 30 is preferably formed at substantially the center of the bottom surface portion of the case body 21.

The first lead 17 is a wire having a single layer structure whose main component is nickel. The metal of which the first lead 17 is composed is nickel or a nickel alloy. The amount of nickel contained in the nickel alloy is preferably 50 mol % or more, more preferably 60 mol % or more. The first lead 17 is preferably a flat wire having a substantially rectangular shape in section in the width direction and has, for example, a width of 2 to 5 mm and a thickness of about 0.1 to 0.2 mm (the same is true in the case of the second lead 18).

The second lead 18 is a wire having a two-layer structure including the Ni layer 18a whose main component is nickel and a Cu layer 18b whose main component is copper. The metal of which the Ni layer 18a is composed is nickel or a nickel alloy and preferably has substantially the same composition as the metal of which the first lead 17 is composed. The metal of which the Cu layer 18b is composed is copper or a copper alloy. The amount of copper contained in the copper alloy is preferably 50 mol % or more, more preferably 60 mol % or more. In the embodiment, the second lead 18 having substantially the same width and the same thickness as the first lead 17 is used.

The ratio ($t_{18a}/t_{18}$) of the thickness $t_{18a}$ of the Ni layer 18a to the thickness $t_{18}$ of the second lead 18 is preferably at least 50% or more. That is, thickness $t_{18a}$ of Ni layer 18a≥thickness $t_{18b}$ of Cu layer 18b preferably holds. A preferable range of $t_{18a}/t_{18}$ is 50 to 90% or 50 to 75%. When $t_{18a}/t_{18}$ is in the range, the depth of fusion of the weld 30 is increased and a high bonding strength is readily achieved while the generation of spatters is suppressed. The detail of this mechanism will be described later.

Figure 6:
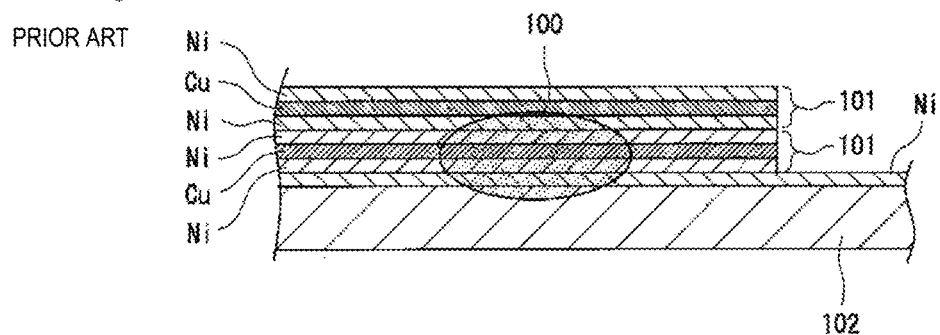
FIG. 6 is a diagram illustrating an example of a weld between conventional negative electrode leads.

The second lead 18 may include at least one metal layer in addition to the Ni layer 18a and the Cu layer 18b within the range in which an object of the present invention is not impaired. The layered structure of the second lead 18 may be a three-layer structure (see FIG. 6) of, for example, Ni layer/Cu layer/Ni layer. However, in consideration of suppression of spatters and improvement in the breaking strength of the weld 30, the second lead 18 preferably has a two-layer structure of the Ni layer 18a and the Cu layer 18b. Also in the case where a third metal layer is disposed, the thickness of the metal layers is preferably decreased.

The weld 30 is formed in a manner in which part of the layered portion 35 formed of the first lead 17 and the second lead 18 that are superposed is welded to the inner surface of the case body 21. The weld 30 is formed, for example, within a range (diameter) of about 30 to 70% of the width of the layered portion 35. The layered portion 35 is formed of the leads that are superposed such that the Ni layer 18a of the second lead 18 faces the first lead 17. At the layered portion 35 (the weld 30), the first lead 17 is disposed on the side of the case body 21. That is, the second lead 18 is disposed on the first lead 17, is not in direct contact with the case body 21, and is connected to the case body 21 with the first lead 17 interposed therebetween.

At the weld 30, the first lead 17, the Ni layer 18a, and the Cu layer 18b are superposed in this order from the side of the case body 21. Since the Ni plating layer 21a is formed on the inner surface of the case body 21, the layers whose main component is nickel are continuous from the Ni plating layer 21a to the Ni layer 18a of the second lead 18. This enables the bonding strength of the weld 30 to be increased. That is, at the weld 30, the layers whose main component is nickel, which are easily melted by welding, are long continuous in the width direction beyond the interface between the first lead 17 and the second lead 18. Accordingly, the depth of fusion at which the metals (nickel) of the members melt can be increased.

It is important for the Cu layer 18b to form the uppermost layer at the weld 30. The Cu layer 18b covers the first lead 17 and the Ni layer 18a, whose main component is nickel, from above. This enables the generation of spatters (scattering of metallic particles) due to welding to be suppressed without decreasing the bonding strength of the weld 30. Since the main component of the Cu layer 18b is copper, which is unlikely to be melted by welding, the Cu layer 18b prevents the depth of fusion at the weld 30 from increasing, but when the Cu layer 18b is the uppermost layer of the weld 30, an influence on the depth of fusion can be reduced. In addition, the uppermost layer is unlikely to melt, and accordingly, spatters are unlikely to be generated. The first lead 17 and the Ni layer 18a are melted by welding, but these are covered by the Cu layer 18b. In other words, the generation of spatters due to welding is greatly affected by a state of the melt of the uppermost layer of the layered portion 35.

Figure 4:
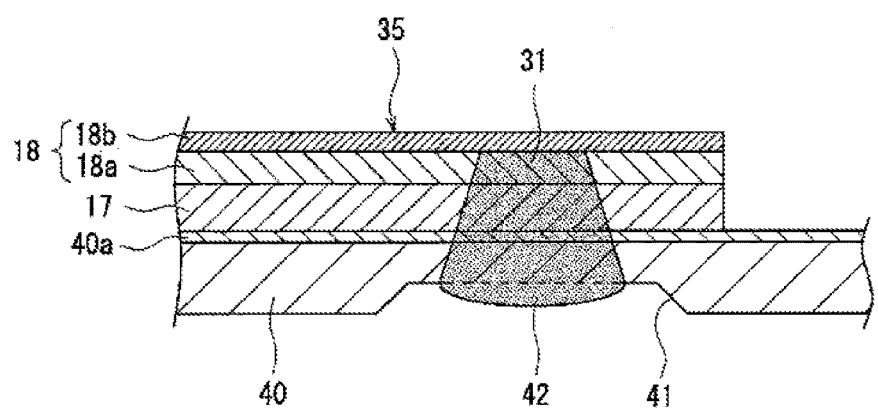
FIG. 4 is a diagram illustrating a weld between other negative electrode leads in the embodiment of the present invention.

FIG. 4 illustrates another weld 31 in the embodiment. FIG. 4 is an enlarged view of the weld 31 and the vicinity thereof as in FIG. 3.

In an example illustrated in FIG. 4, a recessed portion 41 is formed on the outer surface of a case body 40 so as to correspond to a weld area (the weld 31) of the layered portion 35. The recessed portion 41 prevents the total length (length in the vertical direction) of the battery 10 from changing when the case body 21 is melted by laser welding, described later, and an expanding portion 42 is formed. The recessed portion 41 is preferably formed at a position at which the recessed portion 41 overlaps the weld 31 in the thickness direction of the case body 40 and at a circumferential portion thereof.

The recessed portion 41 has, for example, a substantially circular shape when a bottom surface portion of the case body 40 is viewed from the outside. The depth and diameter of the recessed portion 41 are preferably determined in accordance with the size of the expanding portion 42. Specifically, it is necessary for the recessed portion 41 to be deeper than an expansion of the expanding portion 42. It is also necessary for the recessed portion 41 to have a diameter larger than the diameter of the expanding portion 42. The weld 31 is preferably formed at substantially the center of the bottom surface portion of the case body 40 as in the weld 30. The recessed portion 41 is preferably formed so as to correspond to the weld 31 at substantially the center of the outer surface of the bottom surface portion (referred to as an outer bottom portion below) and at a circumferential portion thereof.

The thickness (thickness of a remaining portion) of the case body 40 at a portion on which the recessed portion 41 is formed is preferably lower than or equal to the thickness of the first lead 17 (the second lead 18) in order to decrease a thermal capacity of the case body 40 and to improve the weldability. In consideration of, for example, the pressure resistance of the case body 40, a particularly preferable thickness of the remaining portion is substantially the same as the thickness of the leads.

The weld 31 is formed by, for example, laser welding in which a laser beam is emitted from the outer surface side of the case body 40. The weld 31 achieves the same bonding strength as the weld 30 or a bonding strength higher than the bonding strength of the weld 30. As illustrated in FIG. 4, the expanding portion 42 is formed outside the weld 31 due to an influence of laser welding. The expanding portion 42 is formed within the recessed portion 41. That is, the formation of the recessed portion 41 enables the lowermost surface of the case body 40 to be prevented from bulging (expanding). The detail of a specific method and effect of laser welding will be described later.

A method of manufacturing the battery 10 configured as above, particularly, an example of a step of welding the negative electrode leads (step of forming the welds 30 and 31) will be described in detail with reference to FIGS. 5A and 5B appropriately.

The battery 10 is manufactured by, for example, the following manufacturing steps (referred to as the present manufacturing steps below).

(1) The electrode body 11 (the positive electrode 13, the negative electrode 14, the separator 15, the positive electrode lead 16, the first lead 17, and the second lead 18), the electrolyte, the battery case 12, and so on, which are components of the battery 10, are first prepared. The electrode body 11 is manufactured in a manner in which the positive electrode 13 to which the positive electrode lead 16 is attached and the negative electrode 14 to which the negative electrode leads (the first lead 17 and the second lead 18) are attached are wound with the separator 15 interposed therebetween. The positive electrode 13, the negative electrode 14, the electrolyte, and so on may be manufactured by a known method.

(2) The insulating plates 19 and 20 are subsequently disposed above and below the electrode body 11, respectively, and these are accommodated in the case body 21 in a cylindrical shape with a bottom. The positive electrode lead 16 extends upward via the through-hole of the insulating plate 19, and the negative electrode leads extend downward via the through-hole of the insulating plate 20.

(3) The negative electrode leads are subsequently welded to the inner surface (for example, the inner bottom portion) of the case body 21, and the positive electrode lead 16 is welded to the lower surface of the filter 24 of the sealing body 23.

(4) A non-aqueous electrolyte is finally poured from the opening of the case body 21, and the opening of the case body 21 is closed by the sealing body 23 and the gasket 29.

The present manufacturing steps include a step of attaching the negative electrode leads to the negative electrode 14. In this step, the first lead 17 having a single layer structure and the second lead 18 having a layered structure are attached to the exposed areas 14z formed on the negative electrode 14. The negative electrode leads attached to the negative electrode 14 are different leads whose materials and structures are different from each other, as described above. The negative electrode leads are welded to the exposed areas 14z by, for example, ultrasonic welding.

Figure 5A:
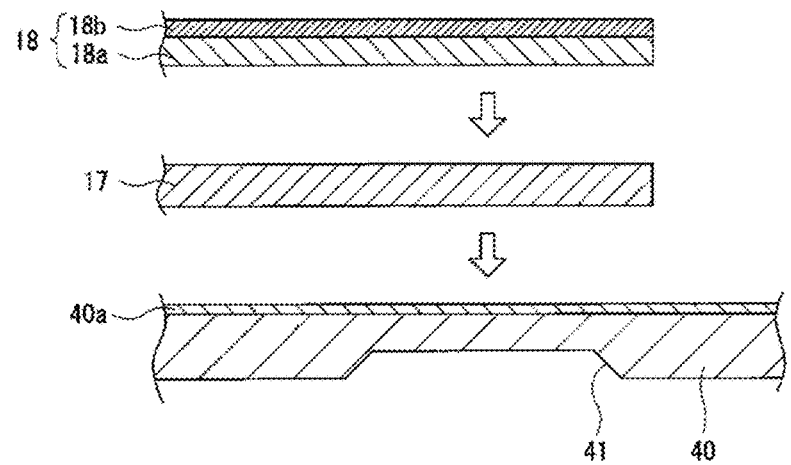
FIG. 5A is a diagram illustrating a method of manufacturing a battery in an embodiment of the present invention.
Figure 5B:
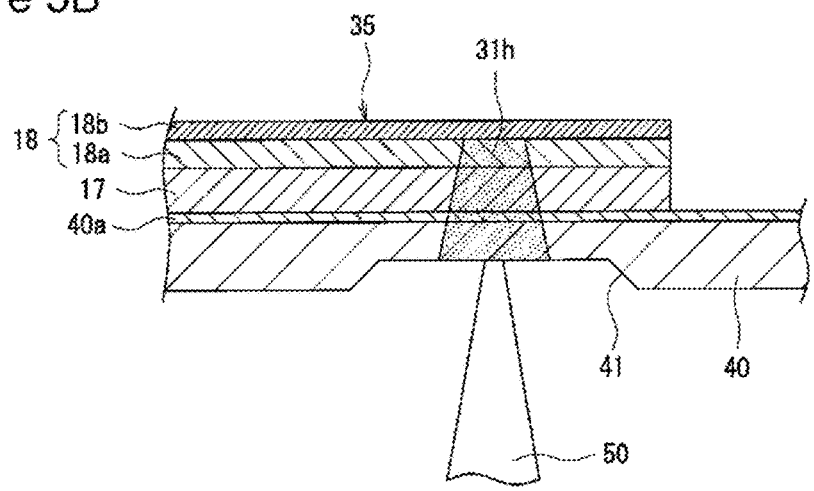
FIG. 5B is a diagram illustrating a method of manufacturing a battery in the embodiment of the present invention.

FIGS. 5A and 5B are diagrams illustrating an example of the step of welding the negative electrode leads. As illustrated in FIGS. 5A and 5B, in the welding step, (i) the layered portion 35 is formed in a manner in which the leads are superposed such that the Ni layer 18a of the second lead 18 faces the first lead 17, and (ii) part of the layered portion 35 is welded to the inner surface of the case body 21. Welding is performed with the first lead 17 at the layered portion 35 facing the side of the case body 21. That is, welding is performed in a state in which the first lead 17 and the inner surface of the case body 21 are in contact with each other and the second lead 18 is disposed on the first lead 17.

The step (i) is a step of forming the layered portion 35 that is to be welded to the case body 21 (see FIG. 5A). The step (i) is performed, for example, before the electrode body 11 is accommodated in the case body 21. The layered portion 35 is formed in a manner in which the leads are superposed such that the Ni layer 18a of the second lead 18 faces the first lead 17, that is, the Cu layer 18b is on the opposite side of the first lead 17, as described above. At this time, the leads are superposed such that the first lead 17 is located below, that is, the first lead 17 is in contact with the inner bottom portion of the case body 21 with the electrode body 11 being accommodated in the case body 21.

The step (ii) is performed after the electrode body 11 is accommodated in the case body 21. When the electrode body 11 is accommodated in the case body 21, the first lead 17 extending downward via the through-hole of the insulating plate 20 comes in contact with the inner bottom portion of the case body 21 (the second lead 18 is not in direct contact with the inner bottom portion). Part of the first lead 17 and part of the second lead 18 are superposed to form the layered portion 35. In the step (ii), part of the layered portion 35 is welded to the inner bottom portion of the case body 21.

The layered portion 35 is welded to the inner bottom portion of the case body 21 by, for example, spot welding (resistance welding). When spot welding is used, one of electrodes is inserted from the opening of the case body 21 and pressed against the upper surface of the layered portion 35, that is, the Cu layer 18b of the second lead 18, and the other electrode is pressed against the outer bottom portion of the case body 21. The weld 31 is formed in a manner in which the layered portion 35 and the bottom surface portion of the case body 21 are melted by Joule heat produced by causing an electric current to flow through the electrodes (see FIG. 3).

FIG. 5B illustrates a laser welding step. Laser welding of the layered portion 35 to the inner bottom portion of the case body 40 is performed in a manner in which the outer bottom portion of the case body 40 is irradiated with a laser beam 50. When a substantially central portion of the outer bottom portion of the case body 40 on which the recessed portion 41 is formed is irradiated with the laser beam 50, the case body 40 made of iron on which a Ni plating layer 40a is formed, the first lead 17 whose main component is nickel, and the Ni layer 18a of the second lead 18 melt. In this case, the expanding portion 42 may be formed (see FIG. 4).

A region 31h in FIG. 5B is a region that melts when irradiated with the laser beam 50. In the case where the outer bottom portion is irradiated with the laser beam 50 for welding, the Cu layer 18b, which is the uppermost layer of the layered portion 35, reflects the laser beam 50 and scarcely melts, and the weld 31 can be formed. That is, the laser welding method enables the generation of spatters to be suppressed more than in the case of spot welding while maintaining a bonding strength higher than or equal to the bonding strength by spot welding.

An example of conditions of laser welding, etc., is as follows.
Laser apparatus: YLR-300-AC made by IPG Photonics Corporation
Laser beam wavelength: 1 μm
Laser beam output: 100 to 300 W Thus, according to the manufacturing method, the bonding strength between the first lead 17 and the second lead 18 and the bonding strength between each of the leads and the case body can be improved while the generation of spatters is suppressed. Accordingly, an internal short circuit of, for example, the electrode body 11 due to spatters generated in the welding step is suppressed, and the battery 10 whose weld has a high breaking strength can be obtained.

The embodiment can be modified appropriately within the range in which an object of the present invention is not impaired.

For example, although a mechanism of discharging gas when the internal pressure is increased is disposed on the sealing body 23 in the embodiment, the mechanism of discharging gas may be disposed on the bottom surface portion of the case body. For example, part of the bottom surface portion on which the recessed portion 41 is formed may be used as a valve member that is broken when the internal pressure is increased.

INDUSTRIAL APPLICABILITY

The present invention can be applied to a battery and a method of manufacturing a battery.

REFERENCE SIGNS LIST 10 battery
11 electrode body
12, 102 battery case
13 positive electrode
14 negative electrode
14a negative electrode current collector
14b negative electrode active material layer
14z exposed area
15 separator
16 positive electrode lead
17 first lead
18 second lead
18a Ni layer
18b Cu layer
19, 20, 26 insulating plate
21, 40 case body
21a, 40a Ni plating layer
22 support portion
23 sealing body
24 filter
25 lower valve member
27 upper valve member
28 cap
29 gasket
30, 31, 100 weld
31h region
35 layered portion
41 recessed portion
42 expanding portion
50 laser beam
101 negative electrode lead

The invention claimed is:
1. A battery comprising: a power generation component including a positive electrode, a negative electrode, and an electrolyte, and a battery case accommodating the power generation component,
wherein the negative electrode includes a first lead having a single layer structure whose main component is nickel, and a second lead having a layered structure including a Ni layer whose main component is nickel and a Cu layer whose main component is copper,
wherein a layered portion is formed of the leads that are superposed such that the Ni layer of the second lead faces the first lead, and wherein part of the layered portion is welded to an inner surface of the battery case with the first lead at the layered portion being disposed on a battery case side.

2. The battery according to claim 1, wherein a recessed portion is formed on an outer surface of the battery case so as to correspond to a weld area of the layered portion.

3. The battery according to claim 1, wherein a ratio of a thickness of the Ni layer to a thickness of the second lead is at least 50% or more.

4. The battery according to claim 1, wherein a Ni plating layer is disposed on the inner surface of the battery case.

5. A method of manufacturing a battery including a power generation component including a positive electrode, a negative electrode, and an electrolyte, and a battery case accommodating the power generation component, comprising:

a step of attaching, to the negative electrode, a first lead having a single layer structure whose main component is nickel, and a second lead having a layered structure including a Ni layer whose main component is nickel and a Cu layer whose main component is copper, and a welding step of forming a layered portion in a manner in which the leads are superposed such that the Ni layer of the second lead faces the first lead and welding part of the layered portion to an inner surface of the battery case with the first lead at the layered portion facing a battery case side.

6. The method according to claim 5, wherein, in the welding step, a laser beam is emitted from an outer surface side of the battery case to weld the part of the layered portion to the inner surface of the battery case.

7. The method according to claim 5, wherein a Ni plating layer is disposed on the inner surface of the battery case.

* * * * *